Feb. 10, 1953     H. S. BEATTIE ET AL     2,627,806
DECIMAL POINT AND COMMA PRINTING MECHANISM
Filed Dec. 3, 1949     10 Sheets-Sheet 1

INVENTORS
H. S. BEATTIE
E. J. RABENDA
R. E. PAGE
BY Frank W. Lonmitzer
ATTORNEY

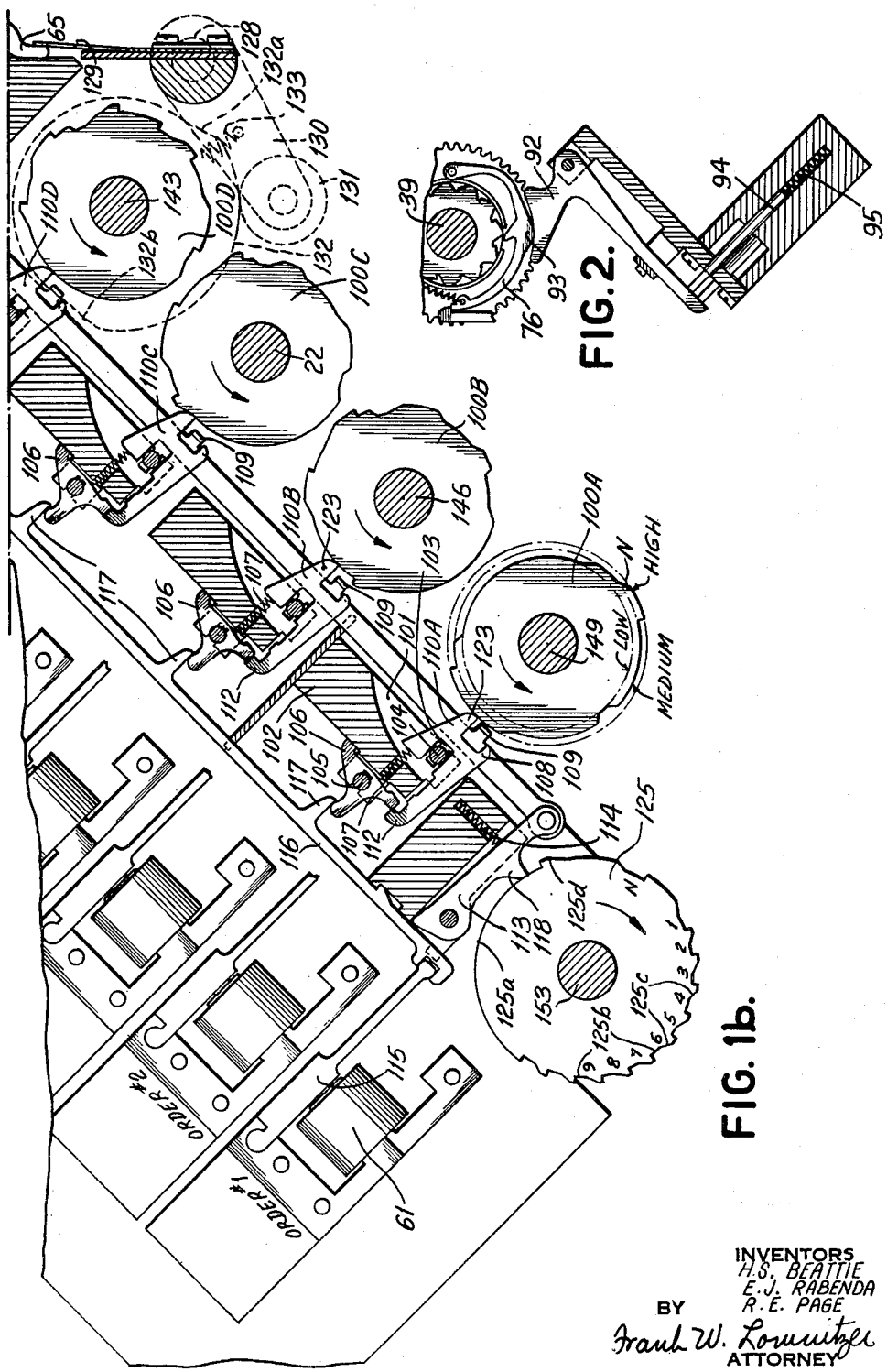

INVENTORS
H.S. BEATTIE
E.J. RABENDA
R.E. PAGE
BY Frank W. Lomnitzer
ATTORNEY

INVENTORS
H. S. BEATTIE
E. J. RABENDA
R. E. PAGE
BY Frank W. Lomnitzer
ATTORNEY

Feb. 10, 1953    H. S. BEATTIE ET AL    2,627,806
DECIMAL POINT AND COMMA PRINTING MECHANISM
Filed Dec. 3, 1949    10 Sheets-Sheet 6

| | 0 | X | R | N PULSE | DIGITS |
|---|---|---|---|---|---|
| 1 | | J | A | | 1 |
| 2 | S | K | B | | 2 |
| 3 | T | L | C | | 3 |
| 4 | U | M | D | | 4 |
| 5 | V | N | E | | 5 |
| 6 | W | O | F | | 6 |
| 7 | X | P | G | | 7 |
| 8 | Y | Q | H | | 8 |
| 9 | Z | R | I | | 9 |
| 0 | | THROUGH ZERO CONTROL | | | 0 |
| 8-3 | ⁊ | # | . | * | |
| 8-4 | ( | ) | , | / | |
| N PULSE | | 0 | ¢ | = | ⌀ |
| 184 PULSE | | | | . | |
| 185 PULSE | ⁊ | | | | |

INVENTORS
H. S. BEATTIE
E. J. RABENDA
R. E. PAGE
BY Frank W. Lowriter
ATTORNEY

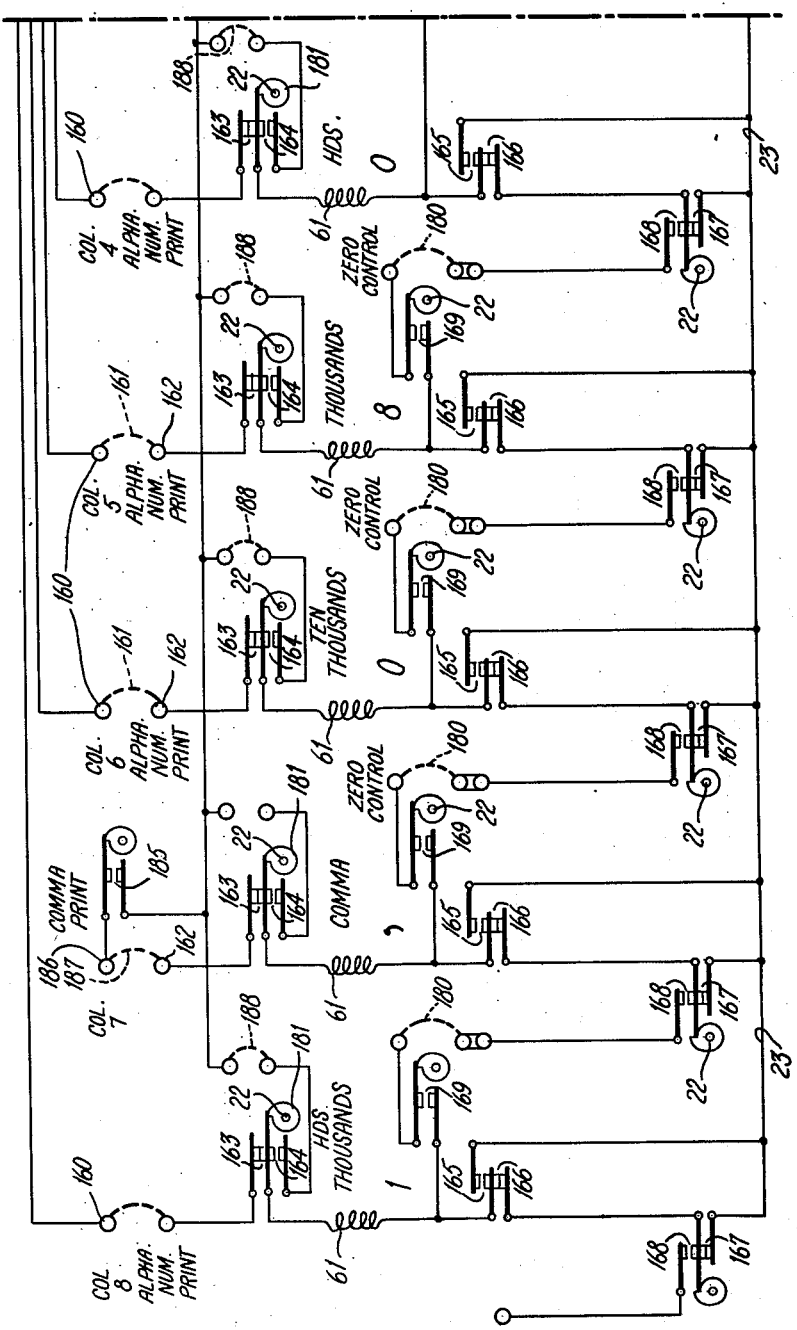

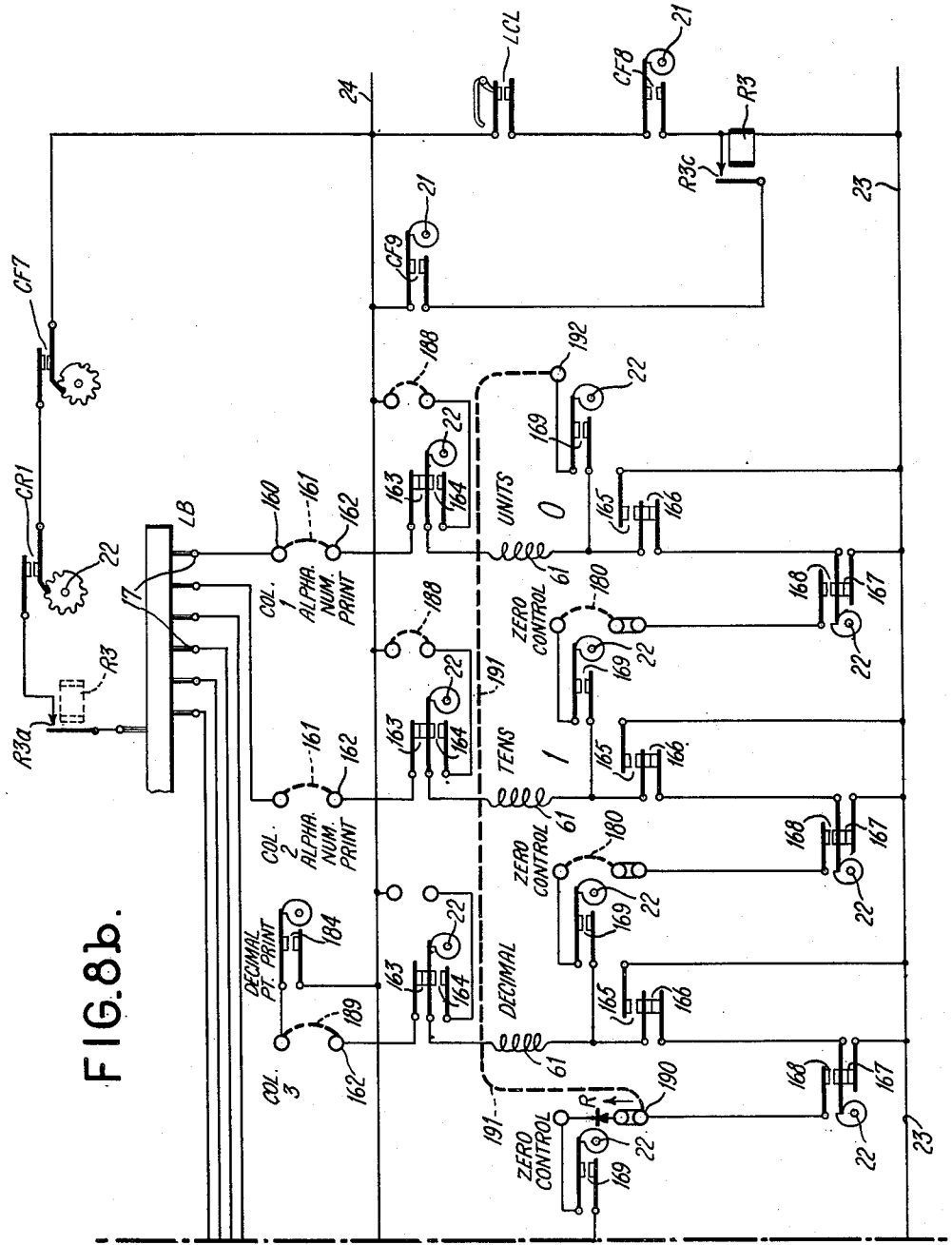

Patented Feb. 10, 1953

2,627,806

UNITED STATES PATENT OFFICE 2,627,806

DECIMAL POINT AND COMMA PRINTING MECHANISM

Horace S. Beattie, Poughkeepsie, Ralph E. Page, Lagrange, and Edward J. Rabenda, Poughkeepsie, N. Y., assignors to International Business Machines Corporation, New York, N. Y., a corporation of New York Application December 3, 1949, Serial No. 131,004

4 Claims. (Cl. 101—93)

This invention relates to printing mechanisms and more particularly to the type which is devised for printing numbers representing monetary amounts.

The invention concerns the provision of zero suppression and zero printing means combined with automatic printing of special punctuation such as a decimal point and a comma.

The present improvements find their best application in the type of printing mechanism adapted for the printing of monetary amounts, which in the decimal monetary system consists of recording dollars and cents. The present arrangement provides for printing the decimal point to the right of the dollars representing digit, and a comma at the right of the thousands of dollars position, and so on. The zero print control is so arranged that it preferably functions in combination with the aforesaid decimal point control that the units and tens order zeros are always printed whether they comprise one or two zeros of a number. Thus, a number 108010 is printed as 1,080.10 in the decimal monetary system. Other numbers such as .10 and .01 illustrate printing of amounts up to one dollar when they include one or more zeros. In general the printing mechanism prints an amount which is conventional and is easily transcribed and interpreted in dollars and cents values.

One feature of the invention is to provide each printing wheel with a decimal point printing type and a comma printing type in order that any printing order may be selected for printing such type; to have both type included in the same group of type; and to provide selective means for selecting either of said type for printing, together with a supplemental selecting means which selects the printing wheel of the desired order which is to print either the comma or decimal point.

A still further feature of the invention is to arrange the comma printing means to be effective only when a significant digit 1–9 is printed in the next higher order. For example, if the number was 180.10, it would be undesirable to print the comma to the left of the hundreds of dollars order and herein it is only done when the thousands of dollars digit is printed. A still further feature relates to the printing of the decimal point and to call it into operation under different conditions, i. e., when either the units or tens order, or both, represent a significant digit 1–9 or when any order to the left of the decimal point is the only order which represents a significant digit 1–9. This can be illustrated, in the first case, in printing the amounts .01 or .10 where the units and tens order digits 1 have called the decimal point printing into operation and, in the second case, by printing 1.00 where the digit 1 of the dollars order has called the decimal point printing into operation.

As to the zero printing control for the printing the necessary 0 in the tens order when the units digit 1–9 is printed, such as .03, a feature of the invention pertains to the control by the decimal point printing means which is effective to call such zero printing means into operation.

Again, in printing the amount 6.00, the zero print control for the units and tens order is rendered effective by the hundreds order since a significant digit 6 is printed but this control is also tendered effective by the decimal point control so both in combination effect the desired zero printing.

The present machine is also arranged so that when necessary the decimal control can be used to print tolerance figures such as .0000. Thus, although a significant figure is not associated with the printed zeros the . decimal will print.

Another purpose of the decimal and comma control feature is to provide a flexible and selective means for punctuating the amounts within one section of the printed form and thereafter utilize that comma and decimal controlling type wheel, so that non-punctuated figures or alphabetic description may be printed by the same wheels. This feature would be required in a case where the heading of a bill is used to describe name of customer, etc., and account number, invoice number, etc., within a "heading"; whereas the "body" of the form would require the amount punctuation.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a and 1b when assembled with Fig. 1a on the top shows the construction of the improved numeric and alphabet printing mechanism.

Fig. 2 is a detail of an overthrow preventing mechanism.

Figs. 8a and 8b comprise an electrical diagram showing the analyzing circuits, and the alphabetic and numeric listing circuits controlled by the card perforation analyzing mechanism, and the punctuation control circuits forming the present invention.

Figure 9:
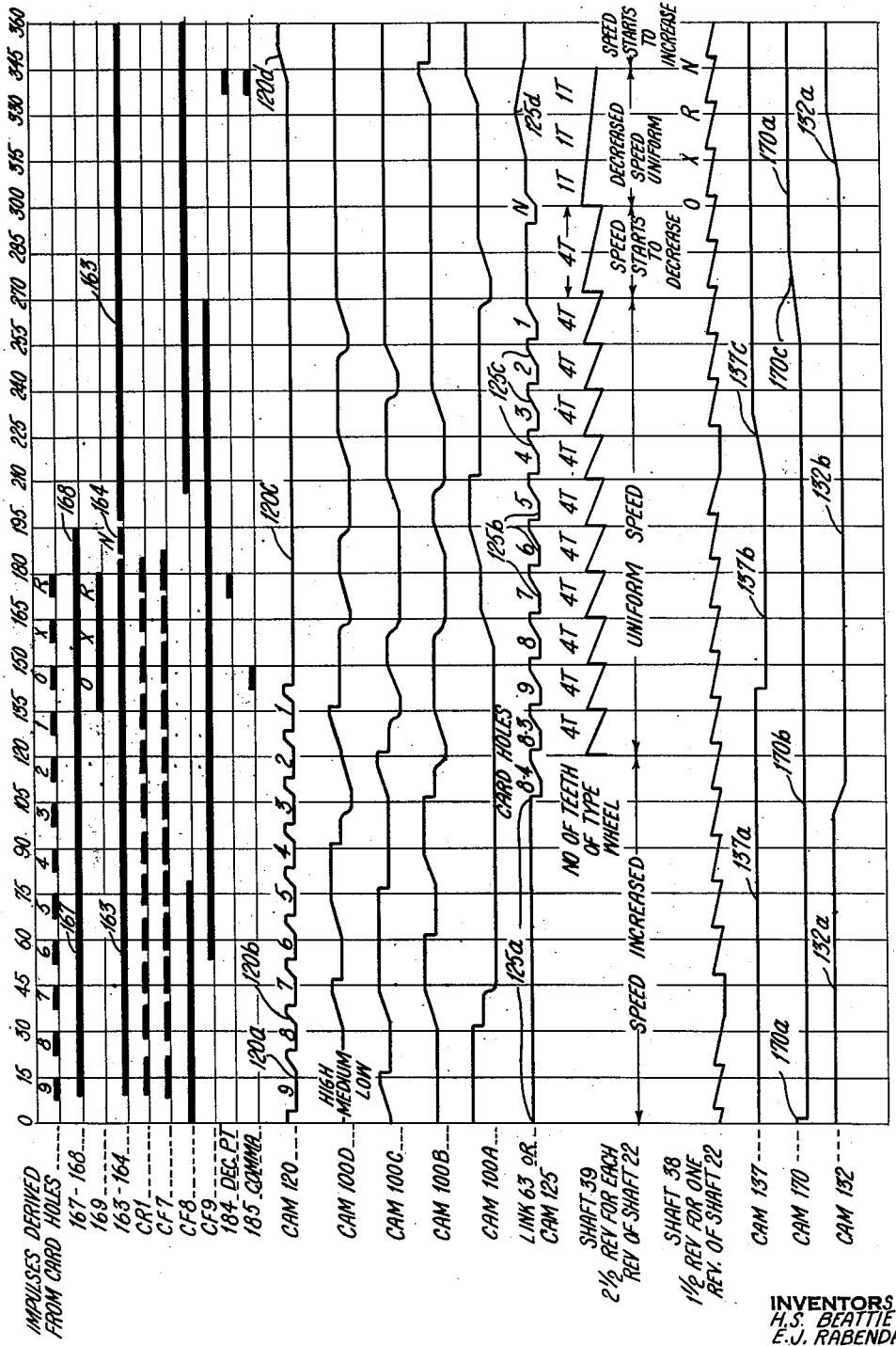

Fig. 9 is a timing diagram of the machine.

Figure 10:
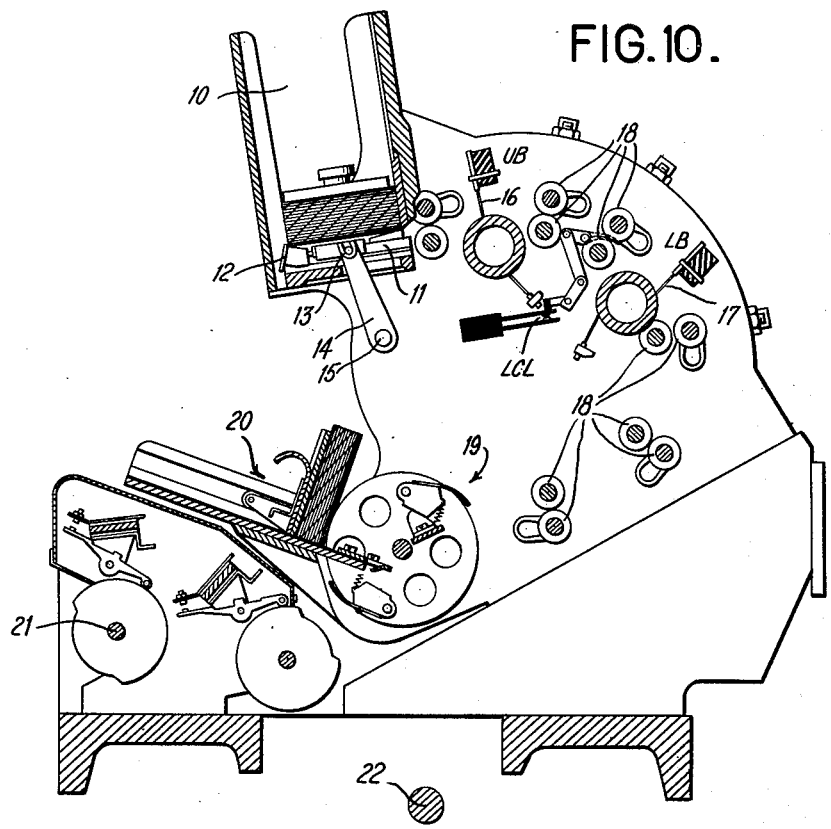

Fig. 10 is a view in side elevation of the card feeding mechanism.

Card feeding and analyzing devices

The card feeding and analyzing devices employed to control the printing mechanism shown herein are similar in construction and operation to the form disclosed in the patents to J. R. Peirce, No. 1,827,259, dated October 13, 1931; No. 2,042,-324, dated May 26, 1936 and No. 2,199,547, dated May 7, 1940.

The card feeding mechanism is shown generally herein in Fig. 10. As is well known, card feeding operations are initiated by the usual manual start key so as to cause the energization of a card feed clutch magnet which causes the cards to be fed singly from the supply hopper 10 by the usual card picker mechanism comprising a slidably mounted reciprocable plate 11 carrying a picker knife 12 for cooperation with the record cards. The plate 11 has a pin and slot connection 13 with an arm 14 secured to a rock shaft 15. Shaft 15 is rocked by the card feed operating mechanism to reciprocate picker knife 12 to cause the card to be fed from the supply hopper 10 to the analyzing mechanism and the card is presented in succession to UB analyzing brushes 16 and LB analyzing brushes 17.

The feeding of record cards from station to station and to ejection is effected by pairs of feeding rollers 18 having the customary driving gear connections to the card feed operating mechanism. The cards pass from the last pair of rollers 18 to a card stacker 19, that shown being of the rotary type. The cards are fed to a storage hopper 20 in the original order. As is usual in the form of card feeding mechanism shown, the machine includes cam operated contacts which consist of the CF contacts driven by a shaft 21 which is rotated one revolution for each card feeding cycle.

A constantly running shaft 22 which rotates one revolution for each machine cycle is utilized to operate the CR cam contacts, designated in the wiring diagram, and other parts of the machine.

Figures 6, 7:
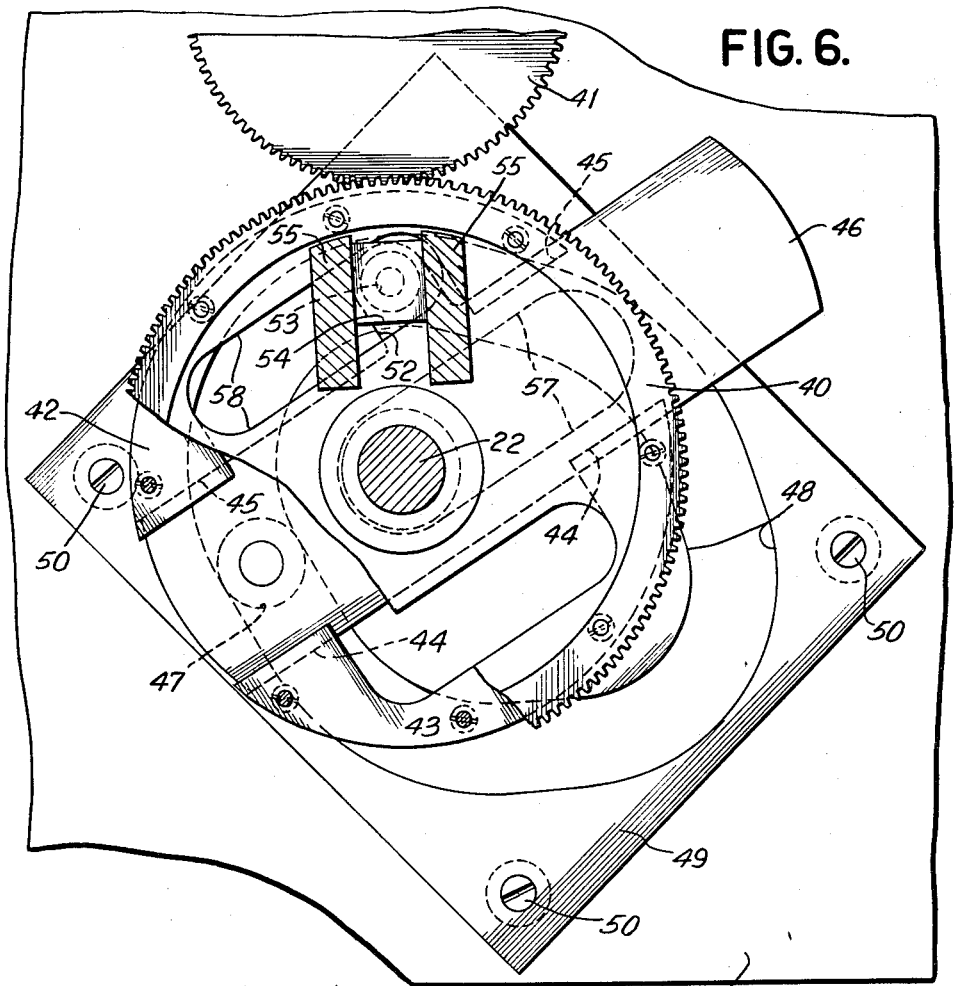
Fig. 6 is a sectional view taken on the line 6—6 of Fig. 4.
Fig. 7 represents the card perforation code and illustrates the alphabetic, numeric characters and other symbols selected by perforations appearing in a column, singly or in combination.

Interposed between the constantly rotating shaft 22 and the driving shaft of the feed mechanism is the usual card feed clutch magnet (magnet 48 of Fig. 6, Patent No. 2,042,324). The manner of energization of this magnet to initiate and maintain card feeding operations as long as cards are fed is very well known and for this reason is not explained herein in detail.

In general, two card feed cycles are initiated by an initial depression of a start key and a re-depression thereof, and the card fed during the second card feed cycle closes card lever contacts LCL. The latter are closed when cam contacts CF8 close at 207° (Fig. 9) and by an obvious circuit an impulse will be directed to relay coil R3 (Fig. 8).

Relay coil R3 closes its contacts R3C and a stick circuit extends from one side of the line 23 through the R3 magnet, R3C contacts, CF9 cam contacts to the other side of the line 24. If card lever contacts LCL are closed when cam contacts CF9 are open, relay coil R3 will be held energized, the energization of the latter then being effected through the card lever contacts LCL and cam contacts CF8. When relay coil R3 is energized, it will close its contacts R3A, thus connecting the contact roll of th LB analyzing brushes 17 to the circuit breakers CR1 and CF7. As long as card feed operations continue, LCL contacts will remain closed to maintain the energization of the relay coil R3 and the closure of its contacts R3A, rendering the LB analyzing brushes 17 effective. After the second manually initiated card feed cycle, successive card feeding cycles automatically ensue as long as cards are fed. For each passage of a card past the LB analyzing brushes, the improved printing mechanism now to be disclosed in detail is controlled so as to print data represented by the card perforations analyzed.

Figure 1A:
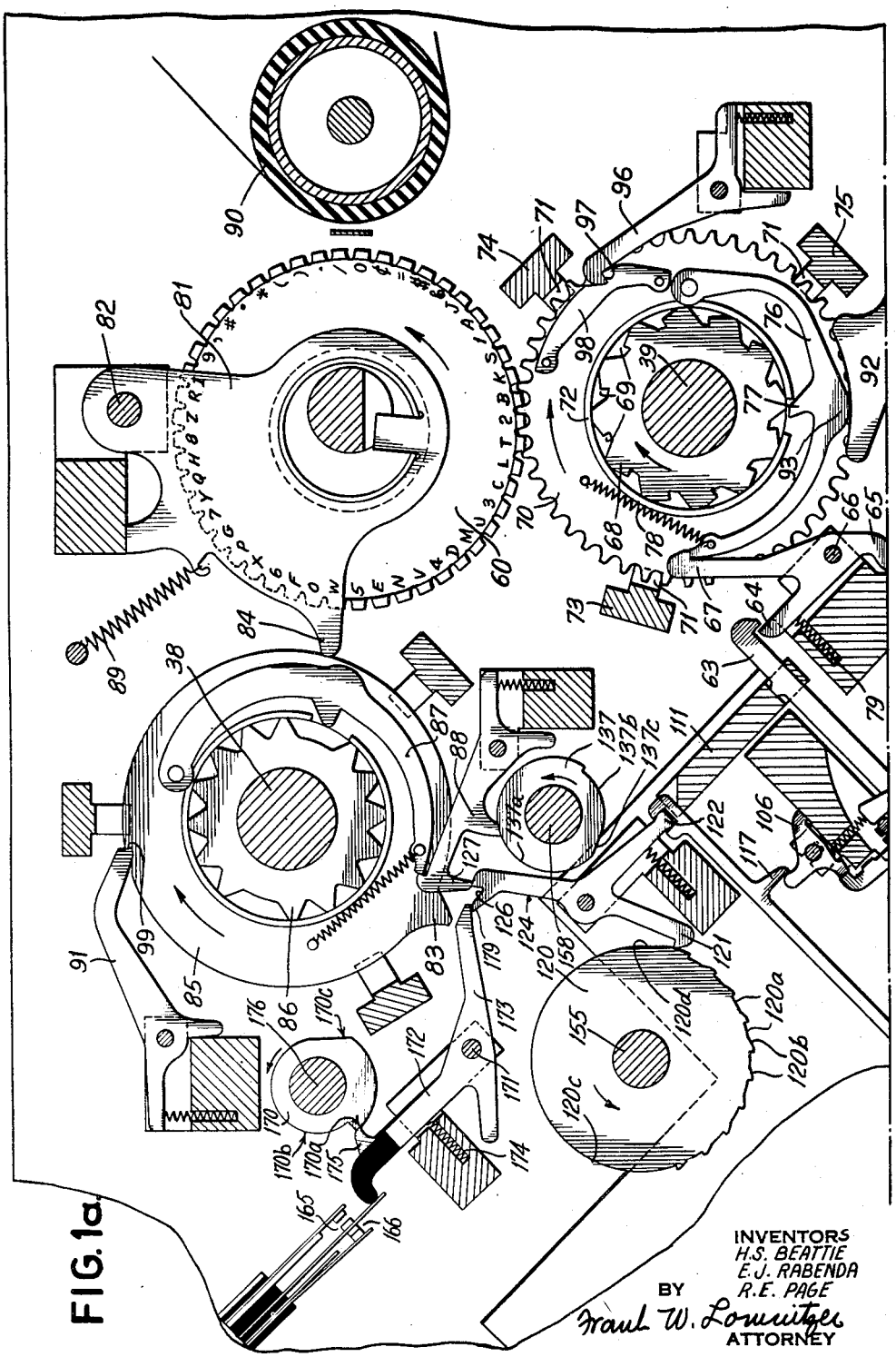

In Fig. 1a reference numeral 38 designates the printing impression drive shaft which is driven with a uniform speed of rotation for each cycle of the operation of the machine. The drive shaft 22 has secured thereto a gear 40 (Figs. 3 and 4) which drives a gear 41 secured to the printing impression drive shaft 38 to rotate the latter at a uniform speed of rotation one and a half revolutions for each revolution of drive shaft 22. Reference numeral 39 designates the type selecting drive shaft which rotates two and one-twelfth revolutions for each operating cycle. At times shaft 39 is driven with a uniform speed of rotation substantially synchronous with the drive shaft 38, but at other times the speed of rotation given to shaft 39 is decreased or increased with respect to the drive shaft 38 for a purpose to be more clearly understood later on. The variable drive for driving shaft 39 at the desired speed will now be described in detail.

Means to drive shaft 39 at variable speeds
(Figs. 3-6)

Figure 3:
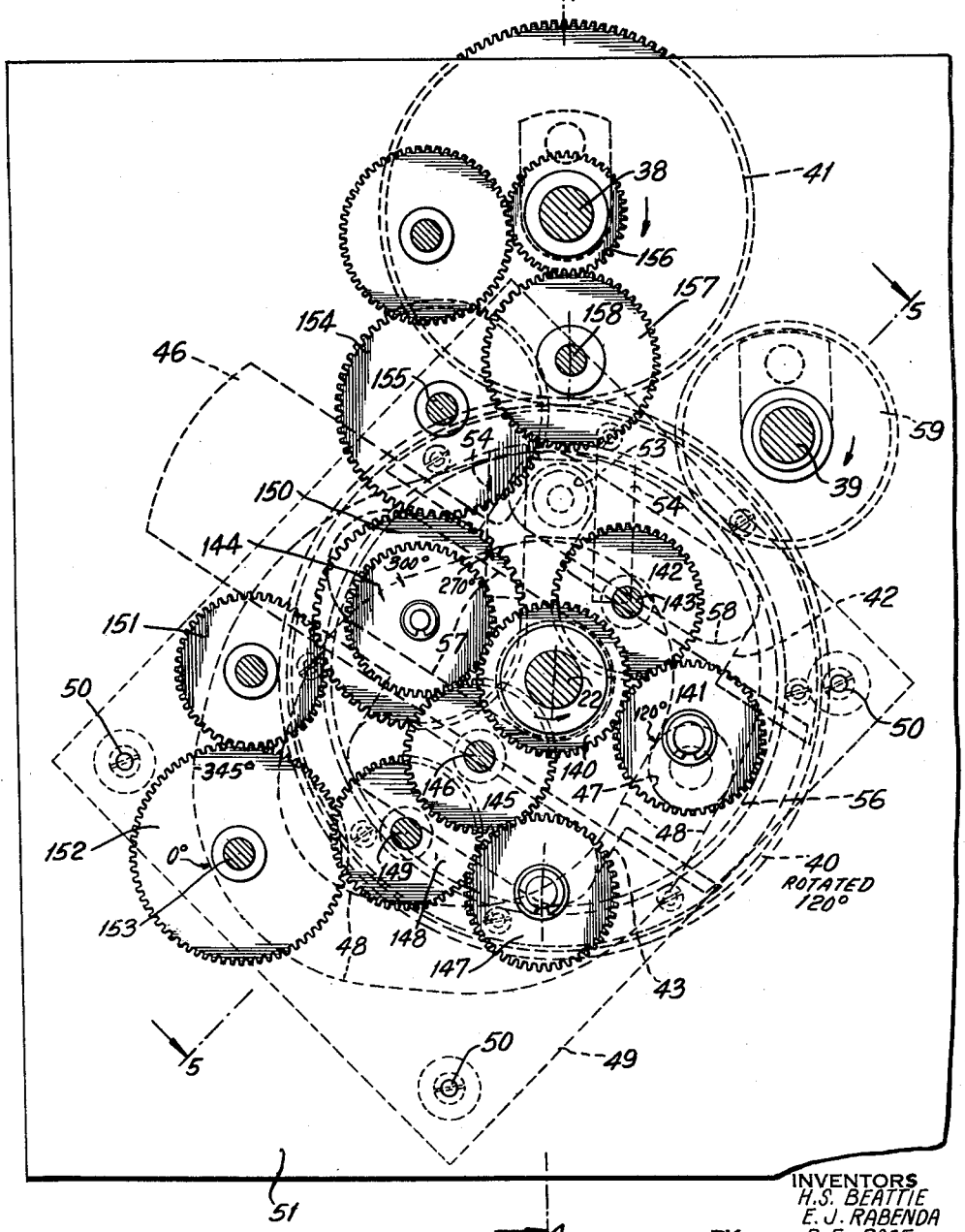
Fig. 3 is a view in side elevation showing the intergearing for driving the driving shafts of the printing mechanism in synchronism.

To the side of the gear 40 and at the periphery thereof there are secured segmental bearing plates 42, 43. The plate 43 is provided with bearing slots 44 and plate 42 with bearing slots 45. Slidably mounted in such bearing slots is a cam follower plate 46. Hence, plates 42, 43 provide the bearing or support for the slidably mounted cam follower plate 46. Obviously, since the gear 40 carries in this manner the cam follower plate 46, the latter rotates with the gear 40 about the shaft 22 in the same counterclockwise direction (Fig. 3).

Cam follower plate 46 carries a cam follower roller 47, fitting in a cam race 48 of a cam plate 49 which is fixed by studs 50 to a stationary frame plate 51. The cam follower plate 46 has an extension 52 (see Figs. 3 and 6) which carries a stud 53 (Fig. 4) and carried by the stud 53 is a square block 54 fitting between plates 55 secured to one side of a gear 56. So far it is obvious that drive shaft 22 drives the gear 40 and through the connecting cam follower plate 46 the gear 56 is driven. The cam race 48 is so designed that the cam follower plate 46 may be moved away from or towards the center of the shaft 22 and to do this without interference the plate 46 has a longitudinal slot 57 (Fig. 6) encircling the shaft 22. Also in view of the movement given to gear 56 at times resulting from the movement given to cam follower plate 46 by the cam race 48 and which movement is relative to the gear 40, the gear 40 has an elongated slot 58 (Fig. 6) through which the stud 53 passes.

The gear 56 (Figs. 3 and 5), through the gear 59, drives the type selecting drive shaft 39 and thus the latter through the variable gear drive just described is driven at a variable speed through the operating cycle of the printing mechanism. For the proper operation of the machine disclosed herein shaft 22 is driven counterclockwise as viewed in Fig. 3.

A group of type consisting of three alphabet type and one numeral type is allocated for each index point position 1-9, as shown in the code of Fig. 7. Shaft 39 is driven at a uniform speed of rotation between 120° and 270° and for each 15° four printing type (4T) past the printing line (see Fig. 9). At about 270° the speed of rotation of the shaft 39 starts to decrease so as to present four printing type past the printing line for 27°. Between 120° and 270° of the cycle of operation the roller 53 will cooperate with a substantially concentric portion of the cam race 48, and since there will be no movement of cam follower plate 46 during this period gear 56 will be driven counterclockwise at the same speed of rotation as the gear 40. When the cam follower roller 47 enters an eccentric cam portion between 270°–300° the speed of rotation of the shaft 39 is reduced so that four printing type are presented for 27°. Between 300°–345° the eccentric part of cam race 48 so reduces the speed of shaft 39 that for each 15° only one printing tooth (1T) will pass by the printing point. At 300° the alphabet type which would be selected by the 0 pilot hole will be adjacent the printing line. At 315° of the cycle of operation the alphabet type of the selected group selected by the X pilot hole will be in position for printing, at 330° the alphabet type selected by the R pilot hole will be in a position to print and at 345° the numeral type of the selected group will be in position to effect an imprint therefrom. Therefore, the slowing down of the speed of the rotation of shaft 39 is provided to selectively effect printing from the selected alphabet or numeral type of the selected group.

During the time that the cam follower roller 47 enters the very eccentric cam portion of cam race 48 between 300°–345°, the cam follower plate 46 under control of the cam race 48 moves outwardly (Fig. 3) with respect to the center of the shaft 37, thus, rotating the gear 56 in a clockwise direction opposite to the counterclockwise direction of rotation of the gear 40. This will result in diminishing the speed of rotation of the gear 56 and shaft 39 during the analysis of the O, X and R index point positions as just described.

After this reduction in speed of gear 56 the follower roller 47 then enters the cam portion after 345° and the latter is so designed as to move plate 46 inwardly (Fig. 3) towards the center of shaft 22 to cause gear 56 to rotate counterclockwise at a speed increased with respect to the gear 40. This increase in speed is initiated at 345° of the operating cycle and continues on over to the next operating cycle to 120° thereof. This increase in speed during such portions of successive machine cycles ensues to make up for the previous relative displacement of gear 56 so that at 120° of the cycle the gears 40 and 56 and parts driven thereby are always at the same relative position.

Alphabet printing mechanism

The machine is preferably provided with alphabet type and means for selecting such type so as to print, aside from numerals, letters making up words or abbreviations.

The printing mechanism shown herein is, in general, the same as that fully shown and described in the patent to Ralph E. Page et al., No. 2,438,071, issued March 16, 1948.

The alphabet type are selected by perforations arranged according to the code shown in Fig. 7. The particular 0, X and R perforation appearing in a column determines which of the several type of a group selected by an index point will be printed. For example, if the perforation should be at the "2" hole and no pilot hole is utilized in either the 0, X, or R positions, the digit 2 will be printed. If a hole is also at 0 such hole will select the type S; if at the X index point position, type K will be selected and if at the R position type B will be selected.

Each index point position selects a group of three non-numeral type and also a numeral type. As will be later described, if a numeral type is to be selected for printing, the printing impression will be taken at the "N" point in the machine cycle, which point is after the R index point position is analyzed, (see Fig. 9, timing for "N Impulse"). The alphabet type selection is provided for by taking printing impressions before the time a numeral type would have been printed and this is effected under control of the holes at 0, X and R index point positions.

If the hole is at the 9 index point position alone, a printing wheel 60 (Fig. 1a) will be rotated counterclockwise until the 9 type is at the printing line and then the printing wheel 60 will be rocked by the N pulse to effect the printing impression. It will be noted that if a perforation is also at the R position, then under control of this perforation the printing wheel will be rocked earlier than for printing the digit 9 to take an imprint from the I type. The perforation at the X position will rock the printing wheel 60 to take an imprint still earlier to print R and the perforation at the 0 position even still earlier to print Z.

The same principle of operation is provided for selecting the type of the other groups of alphabet type and the operation of the printing mechanism for effecting type selection and printing impressions will now be described in detail.

The card is perforated with holes to represent the digits 0–9 and X, R and is passed by the analyzing brushes 17 of the card feeding mechanism previously described to analyze the index points in the order 9, 8, 7 . . . 1, 0, X and R.

By circuits to be subsequently described, when an analyzing brush senses a hole in any of the index point positions 9–1, a circuit is closed to a printing control magnet 61 (Fig. 1b) and for each card column analyzed there is a printing control magnet. In the present machine by mechanisms to be subsequently described in detail the rotation of the type carrying wheel 60 is initiated by the actuation of an operating link 63 (Fig. 1a) at a differential time. For selection of type groups determined by the holes 9–1, such operating link 63 is shifted to the left at differential times between 135–270° of the operating cycle as is shown in the timing diagram (Fig. 9). It will also be recalled that during this time shaft 39 is being rotated at a uniform speed of rotation. The shifting of the operating link 63 at differential times is provided herein to transmit a differentially timed mechanical impulse to trip the type selecting clutch shown in Fig. 1a, now to be described in detail.

For each printing order there is pivoted on a rod 66 a triple arm member consisting of arms 64, 65 and a clutch release arm 67.

Shaft 39 has secured thereto a tube 68 which is fluted transversely along its periphery to provide clutch notches 69. Tube 68 constitutes the driving clutch member. Encircling the clutch tube 68 is a plurality of gears 70, there being one gear for each order of the printing mechanism. For mounting the gears 70 on the clutch tube 68, each gear has integral therewith a flange 72. To provide for the lateral spacing between the gears 70, the gears are guided by guide slots 71 formed in guide blocks 73, 74 and 75. By such spacing members the gears 70 are separated to allow independent rotation and to also locate a clutch pawl 76 which is pivoted on the related gear to cooperate with the clutch release arm 67. The clutch release arm 67 normally holds the clutch pawl 76 in such position that its tooth 77 is out of engagement with any of the clutch notches 69 of the clutch tube 68. When the clutch release arm 67 is rocked as a result of the actuation of the operating link 63 at a differential time, the clutch is engaged because a spring 78 attached to clutch pawl 76 will rock the latter in order that the clutch tooth 77 will engage a clutch notch 69 determined by the differential time the operating link 63 is actuated. The above described clutch is the printing type selecting clutch and causes the differential rotation of the printing wheel 60, since the gear 70 and the printing teeth of the type carrying wheel 60 are intergeared.

Figs. 1a and 1b show the arrangement of the printing devices for a single order and the machine is preferably provided with duplicate devices for printing a plurality of characters.

If the operating link 63 was shifted at about 138° as a result of a hole at the 9 index point position of the controlling column, the clutch release arm 67 would be rocked at this time and pawl 76 would be released and rocked by spring 78 so that clutch tooth 77 engages a clutch notch 69 and printing wheel 60 will thereafter continue to rotate to such position as to successively present the characters Z, R, I and 9 of the group selected by the 9 hole (see Fig. 7) to the printing line between 33°–345°. The differential time at which the operating link 63 is actuated determines the extent of counterclockwise rotation of the printing wheel 60 necessary to select a group of type for printing between 330°–345°. After the predetermined extent of rotation of the printing wheel 60 has been effected and the printing impression has been effected, with the type selecting clutch still engaged, the printing wheel 60 will continue to rotate until the free end of the clutch pawl 76 strikes the clutch release arm 67 which, in the meantime, has been brought to its normal position, by means of a compression spring 79 (Fig. 1a). When such disengagement is effected the printing wheel 60 is at the normal position shown in Fig. 1a.

Each printing wheel 60 is carried by an arm 81 loosely pivoted upon a rod 82 and provided with a rearwardly extending follower extension 84 which is operated by a cam projection 83 of a cam disk 85 which constitutes a driven member of a printing clutch.

Shaft 38 rotates a clutch tube 86 fixed thereto and likewise encircling the clutch tube 86 is the driven clutch disk 85 upon which is pivotally mounted a clutch pawl 87. Clutch disk 85 and parts carried thereby are guided similarly to gear 70. Associated with the clutch pawl 87 is a clutch release arm 88. When the clutch engagement is effected between the clutch pawl 87 and one of the clutch notches of the clutch tube 86, the disk 85 will be rotated in a clockwise direction, whereby the cam projection 83 will cooperate with the follower extension 84 to rock arm 81 about the rod 82 against the action of the return spring 89. The engagement of the clutch now being described is effected at differential times when the printing control magnet 61 for each order is again energized under control of the 0, X and R card controlled impulses, if one of the corresponding holes is present in the related column.

At the present time it should be understood that while the 0, X and R index point positions are being analyzed, the clutch release arm 88 will be rocked to clutch release position as a result of the analysis of such holes. As a result of this clutch engagement, the cam extension 83 approaches the follower extension 84 at the time shaft 39 is rotating at a diminished speed between 330°–345°, to present the type of selected group successively to the printing line. Thus, the particular type which is to be selected from the selected group for printing will depend upon the differential time that the printing control magnet 61 receives a second impulse and, therefore, the time at which the printing clutch is engaged. If the 0 perforation is analyzed, the printing clutch is engaged at the earliest time so as to select the first alphabet type of the selected group. If the perforation is at the X index point position, the printing clutch is engaged at a later time when the next alphabet type of the selected group is at the printing position and obviously when the perforation is at the R index point position, the printing clutch will be engaged at a still later time when the third successive alphabet type of the selected group is at the printing position. By the engagement of the printing clutch at a differential time the desired alphabet type and the numeral type of the selected group may be selected.

When the printing clutch engagement has been effected, each cam 85 will cooperate with the related follower extension 84 to rock the associated printing arm 81 to force the printing wheel 60 against the usual inking ribbon and platen 90 around which platen is positioned the paper strip to be imprinted. As each arm 81 is rocked against the action of the spring 89, the printing wheel 60 is being rotated counterclockwise but since the printing wheel is now rolling over the gear 70, this rolling action will cause an equal and simultaneous rotation in a clockwise direction. Both of these opposite rotations will, in effect, cause the printing wheel to be immobile with respect to its rotation when it moves to the right to strike the platen 90, the type striking the platen squarely and firmly to cause a legible impression.

After the printing operation, when cam extension 83 of the cam disk 85 passes by the follower extension 84, spring 89 will now be effective to return the type wheel carrying arm 81 to normal position and the extension 84 now bears against the circular peripheral edge of the cam disk 85.

After the printing operation, since the type selecting clutch is still engaged, the printing wheel 60 continues to rotate as previously stated until the clutch pawl 76 strikes the clutch release arm 67 which, in the meantime, has been positioned to normal, thereby disengaging the type selecting clutch when the printing wheels are at normal position.

The printing clutch continues its engagement for a complete rotation of the cam 85 and the clutch disengagement is effected by the engagement of the clutch pawl 87 with the clutch release arm 88.

It has been found in practice that when the disengagement of the pawl 76 for the type selecting clutch is effected by striking the clutch release arm 67, there is a tendency of the clutch pawl 76 to rock counterclockwise about its pivotal point, unduly stretching the spring 78. To prevent this action a cushioning arrangement is provided to hold the pawl 76 and is shown partly in the lower right-hand corner of Fig. 1a and more completely in Fig. 2. In a preferred arrangement this constitutes for each type selecting clutch a double arm 92. One arm cooperates with a cam portion 93 of the clutch pawl 76 and the other arm bears against a spring pressed plunger 94 inserted in an aperture 95 partly filled with oil. As the clutch pawl 76 comes around to its normal position, it will strike the clutch release arm 67, forcing its clutch tooth 77 out of the clutch notch 69 it previously engaged and the cam portion 93 of the clutch pawl 76 will strike one arm of the double arm 92, forcing the opposite end downwardly to press the plunger 94. This will force the oil out of the bottom of the recess 95 and around the plunger 94, thus providing a cushioning action on the arm 92 to restrain the clutch pawl 76 so that it cannot move too far outward.

As the free end of the clutch pawl 76 strikes the clutch arm 67 there is a tendency to cause the gear 70 to rebound counterclockwise. This action is prevented by the cooperation of a spring-pressed detent 96 with a shoulder 97 of a plate 98 secured to each gear 70. When the normal position of the clutch is obtained, the detent 96 will engage the shoulder 97 to prevent such rebound and retain the clutch parts in their normal position.

A somewhat similar rebound preventing mechanism is also provided for the printing clutch which consists of a spring-pressed detent 91 cooperating with the shoulder 99 of the cam disk 85.

*Translating and impulse converting arrangement*

The purpose of the above arrangement herein is to translate and convert differentially timed electrical impulses to mechanical impulses and delay the transmission of each mechanical impulse to a later point in the cycle for the purpose of selecting a group of type corresponding to the differentially timed electrical impulse transmitted by the hole or holes analyzed.

Figure 4:
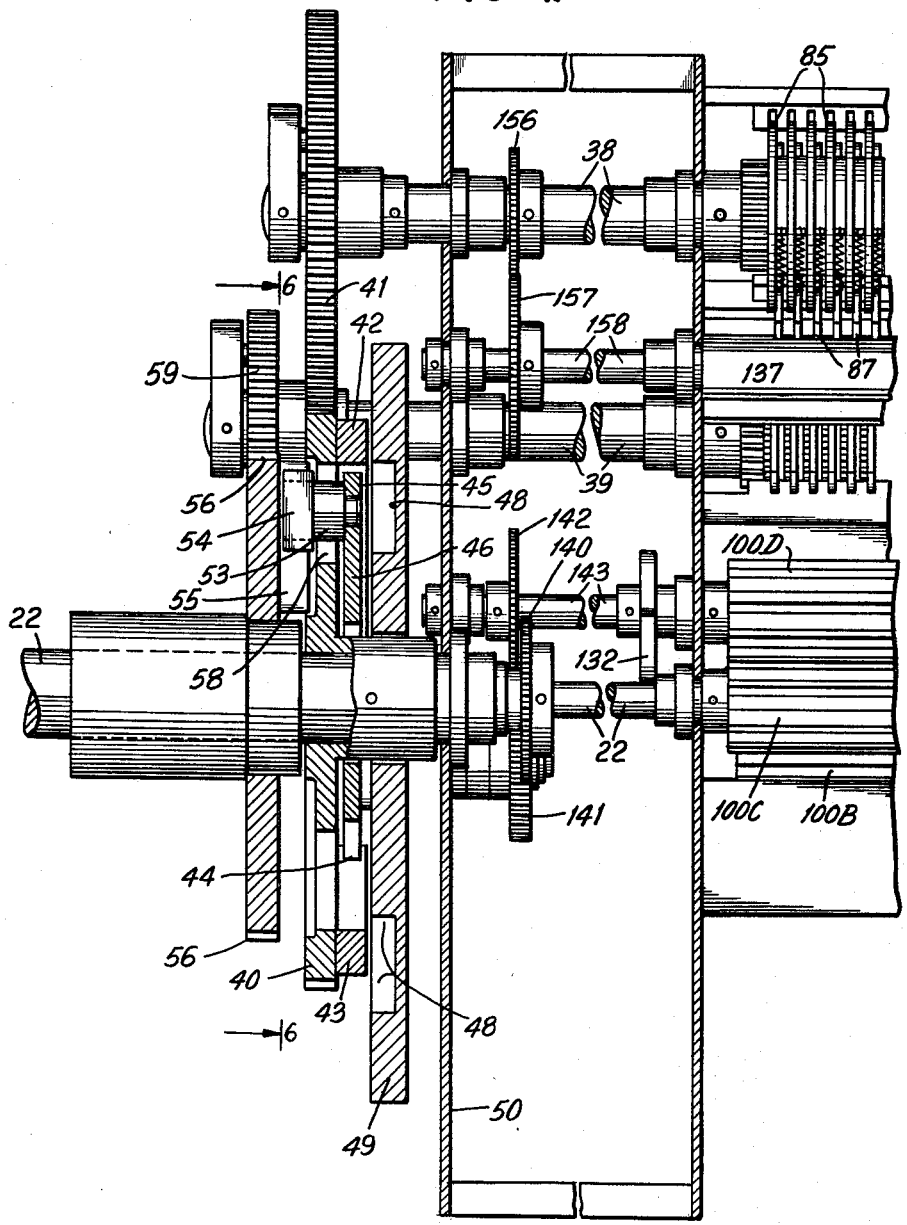
Fig. 4 is a sectional view taken on the line 4—4 of Fig. 3.
Figure 5:
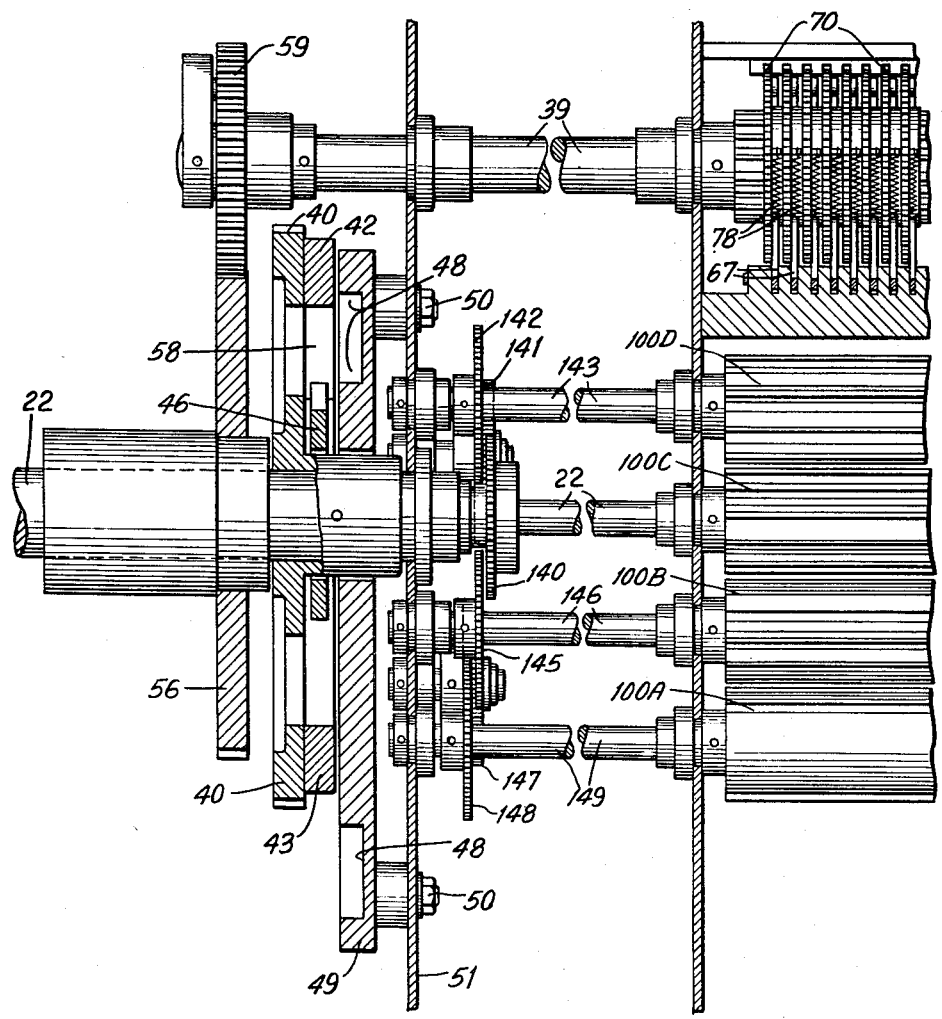
Fig. 5 is a sectional view taken on the line 5—5 of Fig. 3.

Cams 100A, 100B, 100C and 100D (Figs. 1a, 1b and 2) are driven by driving means to be subsequently described one revolution for each cycle of operation of the machine. It will be noted that these cams differ in their cam contours and the particular cam portion which is effective in in each point of the operating cycle is shown in the timing diagram of Fig. 9. Each of the cams is provided with cam heights which are identified by three dotted circles associated with the cam 100A (Fig. 1b), which circles are of three different diameters and represent the heights of the cam contours as Low, Medium and High. The corresponding designation is shown in the timing diagram of Fig. 9 for such cams to identify the particular cam portion effective in each point of the operating cycle. The cams 100A, 100B, 100C and 100D may for convenience in construction be extended longitudinally as shown in Figs. 4 and 5 to provide fluted cam rods having the configuration and outline in Fig. 1b to cooperate with a plurality of orders.

Each cam 100 cooperates with a related releasing and blocking member 110. The reason that the member 110 is called releasing member is that when elevated a predetermined distance by the Medium or High cam portion of the related cam 100 it will release the operating link 63 for movement but when in its normal lower position (due to the Low cam portion) it will block the link 63 against movement. Each member 110 is slidably mounted in a slot 101 of a guide block 102 and is further guided by a rod 104 which receives a guide slot 103 of the related member 110. Also pivoted on a rod 105 carried by the block 102 is a latch pawl 106. Interposed between the pawl 106 and the associated member 110 is a compression spring 107, the spring 107 functioning to urge the member 110 downwardly so as to always press against and contact with the cam contour of the related cam 100. Each member 110 is provided with a shoulder 108 cooperating with a lug 109 formed as an integral part of the link 63.

The link 63, referring to Fig. 1a, is slidably mounted in guide slots formed in a support plate 111 to support the link 63 at one end and guide its movement, and referring to Fig. 1b the other end of the link 63 is dependently hung by arm 113, which arm has a cam follower extension 118. A compression spring 114 fitting in a spring support and guide block for arm 113 urges the link 63 to the left and when such spring is effective for action under control of a cam 125 it serves as the source of mechanical impulse transmitted to link 63 at a differential time to rock the clutch release arm 67 to initiate type group selection.

Recalling now that each cam 100 has cam contours of three different heights, it should be observed that when member 110 is at a position determined by the low portion of the cam 100, the shoulder 108 abuts lug 109 to block the link 63 from movement to the left, urged by compression of the spring 114. In attempting to do so lug 109 will bear against the shoulder 108 and urge the member 110 clockwise, which movement is restrained by the cooperation of an upstanding hooked portion 112 of member 110 against the latching end of the pawl 106. Assuming now that a cam has been rotated so that the Medium cam portion of the cam contour has raised the member 110, such difference in cam height with respect to the Low cam height will elevate shoulder 108 slightly further above the related lug 109 and by the continued cooperation of the hooked extension 112 of the member 110 with the extremity of the pawl 106, clockwise movement of the pawl 110 will be still restrained.

Assuming now that the High cam portion has positioned the member 110 to its maximum height, the shoulder 108 will be still further above the lug 109 and the member 110 is now in such position that the compression spring 107 will be effective to rock the member 110 clockwise so that a hooked extension 112 will catch over the latch end of pawl 106, provided that at this time the pawl 106 is rocked counterclockwise due to the concurrent analysis of a hole in the card at the time the member 110 is in its highest position. If the pawl 106 is not rocked slightly counterclockwise, no latching of the member 110 will take place. Summarizing, whenever the High portion of a cam has elevated a member 110 to the highest position, such member will be latched if the related pawl 106 is concurrently rocked to latching position. If there is no rocking of the pawl 106 at this time, member 110 will not be latched, and will be subsequently free to move up and down in accordance with the successive cam contour as the related cam 100 rotates.

The above description has been confined to the operation of the parts under control of the cam 100A but it should be noted that identical operations are effected under control of the remaining cams 100B, 100C and 100D. For this reason, the description of operation need not be repeated for duplicate parts.

For the purpose of rocking the pawls 106 to latch those members 110 which are at their highest position at the time a hole is sensed in the card, it will be seen that referring to Fig. 1b each printing magnet 61 when energized attracts an armature 115 and rocks the same so as to shift a related connected link 116 to the left. Extending from the link 116 are four integral extensions 117, each of which cooperates with the related pawl 106. The result of this construction is that the impulse directed to the magnet 61 will shift the link 116 and rock the four pawls 106 concurrently but only that pawl 106 is effective for latching the related member 110 if the associated member 110 has been elevated to its highest position. Therefore, one or more of the pawls 106 may be rocked idly at the same time without latching the related members 110.

To prevent the armature 115 from sticking to the core of the magnet 61 due to residual magnetism, it is desirable to provide means to positively restore the link 116 and armature 115 to normal by mechanical means timed with the rotation of the cams 100. To this end there is provided a magnet knockoff cam 120 (Fig. 1a) notched as shown. A follower arm 121 of a clutch release arm 124 cooperating with the cam 120 has a mechanical connection 122 with the link 116. At the time the magnet 61 is energized it will be observed that follower arm 121 cooperates with a notch 120a of the cam 120. Thereafter, such arm cooperates with the following cam portion 120b to rock arm 121, link 116 and armature 115, restoring the armature 115 to normal if it should remain attracted to the core under the above circumstances.

Referring now to Fig. 9, it is obvious that at the time the card holes 9–1 are analyzed, one or more cams 100 will have their High portions in cooperation with the latching members 110. At the time the 9 card hole is analyzed the High portions of cams 100A and 100C will be effective. At the time the 8 card hole is analyzed, only cam 100A will have a High portion effective at this time. For all of the card holes 9–1, this condition may be represented by the following table:

TABLE I

| Holes | Members 110 Latched |
| --- | --- |
| 9 | 110A, 110C. |
| 8 | 110A. |
| 7 | 110B, 110C, 110D. |
| 6 | 110B, 110C. |
| 5 | 110C, 110D. |
| 4 | 110B, 110D. |
| 3 | 110B. |
| 2 | 110C. |
| 1 | 110D. |

It is obvious from the above table that members 110 are latched singly or in predetermined combinations, so that at the termination of the analysis of the card holes 9–1, some of the members 110 will be latched and others will not be latched and therefore free to be positioned according to the contour of their cams during their subsequent rotation. It is explained that once a member 110 is latched it is not free to thereafter move upwardly and downwardly in accordance with the subsequent cam contour of the related cam, but remaining unlatched members can do so.

Movement of the operating link 63 to the left during the time that the 8–3 holes are analyzed, which movement might be permitted if all of the four members 110 for this order may be either latched or elevated so as to be above the lugs 109, is restrained by a cam portion 125a of cam 125 (Fig. 1b). This cam, through driving means to be subsequently explained, is driven synchronously with the cams 100 and 120 and cooperates with the follower extension 118 of arm 113. As shown in the timing diagram, during the analysis of 8–3 holes, the high portion 125a of cam 125 will restrain movement of the operating link 63 to the left. The aforesaid Patent No. 2,438,071 to Ralph E. Page et al. fully describes the manner of selecting the two groups of punctuation type (see Fig. 7) by the holes 8–3 or 8–4 in combination, to which recourse may be had for a full and complete understanding.

After latching of members 110 in predetermined combinations the contour of the cams 100A, 100B, 100C and 100D which are thereafter effective will determine the time in the operating cycle that the operating link 63 will be moved to the left in a manner now to be described in detail:

After one or more members 110 are latched in combination according to the holes analyzed as indicated in the preceding table, the further rotation of the cams 100 will raise and lower the remaining unlatched members 110 according to the cam contours of the respective cams, but during said further rotation of the cams the link 63 will be restrained against movement by one or more of such unlatched members until a point is reached in the operating cycle when the cams related to the unlatched members concurrently present cam operations of Medium height to the unlatched members. It will be recalled that since the latched members 110 are so positioned that they do not restrain the movement of the link 63 under the influence of the spring 114 and, further, the elevation of any unlatched member by a cam portion of Medium height will also unlock the link 63, it is obvious that when both of these conditions exist for four of the latches 110, link 63 is then free to move under the influence of the spring 114 and cam 125. This will be made clear by reference to a particular example.

If, for example, the 9 hole is sensed, members 110A and 110C are latched due to the High cam portion of their respective cams 100A and 100C and such latching of members 110A and 110C occurs about 7½° of the operating cycle when the 9 hole is analyzed (see Fig. 9). At this time, the members 110A and 110C are latched in the highest position so that they unlock the operating link 63 at such positions. However, cams 100B and 100D in their subsequent rotation continue to raise and lower the related unlatched members 110B and 110D and one or the other of such unlatched members 110B, 110D will restrain the operating link 63 from movement until about 138° of the operating cycle, at which time both cams 110B and 110D, through their Medium high cam portions, shift related latching members 110B and 110D to unlock the link 63. At this time cam follower extension 118 of the arm 113 will cooperate with the notch 125b designated "9" in both Fig. 1b and the timing diagram of Fig. 9. Operating link 63 is now unlocked at four points and the movement of the link to the left is effected at about 138° by spring 114. The link will now operate the clutch release arm 67 and therefore engage the type selecting clutch to initiate the rotation of the printing wheel 60 to select the group of type Z, R, I and 9.

The type selecting clutch will be engaged at about 150° of the operating cycle and from the timing diagram (Fig. 9) the type carrying wheel 60 will rotate 4, 4, 4, 4, 4, 4, 4, 4, 4, or thirty-six teeth, and at about 300° of the operating cycle the Z type will now be in position to print. At 300° of the operating cycle, the speed of rotation of the type wheel is decreased to successively present the type of selected group in the order Z, R, I, and such type are selected for printing in accordance whether the pilot hole is 0, X or R.

Reverting now to Fig. 1b, when the operating link 63 is moved to the left to effect the engagement of the type selecting clutch the cam follower extension 118 is in the bottom of the notch 125b of the cam disk 125 and further rotation of the cam 125 in a clockwise direction will, through the following inclined cam portion 125c, cooperate with the cam follower extension 118 to positively restore the operating link 63 to the right without, however, causing the unlatching of any latched member 110. At about 330°, an extra high cam portion 125d will shift link 63 to the right beyond the Fig. 1b position, and in so doing for those members 110 which have been latched lug 109 will engage the shoulder 123 of the respective member 110 to rock the same counterclockwise to unlatching position, spring 107 being compressed during this operation to rock the pawl 106 to normal position shown in Fig. 1b. With respect to any unlatched member 110, movement of the operating link 63 to the right at this time may also effect movement of such members 110 but the operation of such is ineffective.

It is desirable to provide means to insure that the clutch release arms 67 are at their normal position and will remain so when engaged by the extremity of the clutch pawls 76 to unlatch the latter from the ratchet teeth 69. Such means now to be described is independent of the springs 79. Referring to Fig. 1b there is pivoted on a shaft 128 a plate which has fixed thereto a comb plate consisting of spring-formed fingers 129 which bear against the lower extensions 65 of the clutch release arms 67. Attached to shaft 128 is a follower arm 130 carrying a roller 131, cooperating with a cam 132 secured to a drive shaft 143. From Fig. 9 it will be seen that a cam rise 132a operative at about 306° of the operating cycle is effective to cooperate with the follower roller 131 to rock the shaft 128 counterclockwise, pressing the spring fingers 129 against the related extensions 65 of the clutch release arms 67, positively retracting them to the normal position shown in Fig. 1a. Thus, it is insured that clutch release arms 67 will be in such position that they will be in the path of the free ends of the clutch pawls 76 to move them to unclutching positions.

A low portion 132b of such cam 132 is effective to enable the follower arm 130 to be rocked by a spring 133 to cooperate with such low portion 132b which releases the spring pressure on the clutch release arm 67 to free the latter for rocking to engage the type selecting clutch.

Upon analysis of such 0, X, R holes through circuits to be described, the second energization of the magnet 61 again attracts its armature 115 and shifts link 116. The latter thereupon rocks the clutch release arm 124 to unlatch the clutch release arm 88 of the printing clutch. At this time a low portion 120c (see Figs. 1a and 9) of cam 120 cooperates with the cam follower extension 121 so as not to restrain the rocking of clutch release arm 124. When the clutch release arm 88 is unlatched, a depending extension 127 moves in a clearance portion 126 of said arm 124. Cam disk 83 will now rotate clockwise and the cam extension 83 will strike the follower extension 84 at the time the selected type is at the printing line to effect the printing impression.

It is undesirable to have the clutch release arm 88 released whenever link 116 is rocked the first time to rock arm 124, due to the analysis of card holes 1-9 and to this end a high portion 137a of cam 137 cooperates with arm 88 to block it against movement to release the printing clutch during the analysis of holes 1-9. When holes 0, X and R are analyzed the low portion of cam 137b (see Fig. 9) will cooperate with clutch release arm 88 to permit its rocking to engage the printing clutch. After the analysis of the 0, X, R holes, the cam rise 137c of cam 137 will function to positively retract the clutch release arm 88 to normal position to cause disengagement of the clutch release pawl 87 after a complete revolution of the printing clutch. At the termination of the operating cycle, a cam rise 120d of cam 120 functions to rock the clutch release arm 124 clockwise to again position it beneath the extension 135 of the clutch release arm 88, which previously has been elevated to the position shown in Fig. 1a. The cam rise 120d also shifts link 116 to restore armature 115 to normal if it should stick to the core of magnet 61.

While the operation of the machine has been described in connection with the selection of the group of type under control of the 9 card hole, the same principle of operation for effecting the above results is involved for other holes as is evident from the following table:

TABLE II

| Hole | Members 110 Latched | Mechanical Impulse At— | Cams 100 at Medium Cam Portion |
|---|---|---|---|
|  |  | Degrees |  |
| 9 | 110A, 110C | 138 | 100B, 100D. |
| 8 | 110A | 153 | 100B, 100C, 100D. |
| 7 | 110B, 110C, 110D | 168 | 100A. |
| 6 | 110B, 110C | 183 | 100A, 100B. |
| 5 | 110C, 110D | 198 | 100A, 100D. |
| 4 | 110B, 110D | 213 | 100C, 100A. |
| 3 | 110B | 228 | 100A, 100C, 100D. |
| 2 | 110C | 243 | 100A, 100B, 100D. |
| 1 | 110D | 258 | 100A, 100B, 100C. |

It will be recognized from this table that the concurrent position of cams 100 at a Medium height cam portion for those cams which have not previously latched members 110, will determine the time the mechanical impulse is transmitted.

The machine includes a driving means driven by the shaft 22 for rotating the cams 100A, 100B, 100C and 100D, 120, 125, 132, and 137 in synchronous relationship and such cams are driven one complete revolution for each operating cycle.

The driving means for driving cams 100A, 100B, 100C and 100D will now be described. Secured to shaft 22 is a gear 140 (Fig. 3) which, through a gear 141, drives a gear 142 secured to the drive shaft 143 for the cam 100D and cam 132. Shaft 22 is extended, as shown in Fig. 5, to directly drive the cam 100C. Referring to Fig. 3, gear 140, through a gear 144, drives a gear 145 secured to the drive shaft 146 for cam 100B.

Gear 145, through an idler gear 147, drives a gear 148 secured to the drive shaft 149 for the cam 100A. By such driving means the cams 100A, 100B, 100C, 100D, and 132 are driven synchronously.

Referring to Fig. 3 gear 144 has rotatable therewith a gear 150 which, through an idler gear 151, drives a gear 152 attached to the shaft 153 to which the cam 125 is secured.

Gear 150 also meshes with a gear 154 secured to a shaft 155 to which shaft the cam 120 is secured.

Also referring to Fig. 3 to drive shaft 38 there is secured a gear 156 which meshes with a larger gear 157 secured to a shaft 158 to which shaft the cam 137 is secured.

Thus, through the intergearing last described, the operating cams 120, 125 and 137 are driven synchronously with the operating cams 100A, 100B, 100C and 100D.

*Operation of machine in connection with wiring diagram (Fig. 8)*

Fig. 8 illustrates the wiring diagram for a plurality of orders, each of which is wired alike for either numeric, alphabetic listing, or for printing special symbols in a manner to be later described.

The card analyzing brushes related to the selected controlling card columns terminate at plug sockets 160, and plug connections 161 are made therefrom to the plug sockets 162 of the selected printing orders for printing numerical, alphabetical or special characters, with the exception of comma and decimal point printing independent of card perforations.

The print control circuit is from the line 24, through CF7, CR1 circuit breaker contacts, relay contacts R3A closed during analysis of all card holes, contact roll of LB analyzing brushes 17, plug socket 160, plug connection 161, plug socket 162, cam operated contacts 163 closed during analysis of all card holes 9–1, 0, X, R (see Fig. 9), print magnet 61, contacts 166, cam contacts 167 closed during analysis of 9–1 card holes, to line 23.

Thus, for numeric listing digits 9–1 the above circuit is closed to energize print magnet 61 and thus through the translator and converter select the digit type 9–1. Printing of 0 in orders to the right of the significant digit 1–9 in the highest order is described in the subsequent section "Zero Print Control Circuit."

The transmission of the N impulse to cause engagement of the printing clutch to print digits 1–9 is effected by a circuit from line 24, through contacts 164 closed at about 189° by a cam 181 driven by shaft 22 (see Fig. 9), print control magnet 61, and contacts 165 now closed in a manner which will be presently explained, to line 23. The N impulse causes the printing clutch to be engaged to initiate rotation of printing cam 85 at a time which will effect an imprint from the selected digit type 1–9, and from the 0 type in a manner to be explained latter.

Contacts 165, 166 are provided for each order and are controlled by the arrangement shown in Fig. 1a for one order. Pivoted on a rod 171 is a double arm 172, 173 urged by a spring 174 so that a projection 175 of arm 172 normally rests upon a high part 170a of a cam 170. Cam 170 is secured to a shaft 176. From Fig. 3 it will be seen that to shaft 176 there is secured a gear 177 intermeshing with a gear 178 secured to the shaft 38. Thus, cam 170 is driven synchronously with the other operating parts of the machine.

During the initial part of each cycle, at about 3° the counterclockwise rotation of cam 170 coordinates projection 175 with the lowest part 170b of cam 170, thus enabling spring 174 to rock arm 172, 173 slightly until the extremity of arm 173 rests upon a shoulder 179 of clutch release arm 126 but in so doing there is no change in the position of contacts 166, 165. However, whenever link 116 is shifted to the left to rock the clutch release arm 124 due to the energization of print control magnet 61 when card holes 9–1, 0, X, R are analyzed, shoulder 179 is moved away from the extremity of arm 173, and thus the action of spring 174 causes contacts 166 to open and contacts 165 to close. The low part 170b of cam 170 extends up to 255°, enabling transfer of contacts 165—166 as a result of the analysis of any of the holes 9–1, 0, X, R. After 255° a cam portion 170c of cam 170 is operative to cam arm 172, 173 to normal to again be relatched by clutch release arm 124.

It is explained that to avoid arcing at the contacts 165, 166, these contacts are so arranged as to have contacts 165 make before contacts 166 break, thus maintaining the continuity of the circuit at this point.

Contacts 166 are, of course, normally closed to enable the closure of the print circuit for type selection, and as a result of the analysis of card holes 1–9, 0, X, R contacts 165 are closed at the time the N impulse is transmitted by cam operated contacts 164 to the print control magnet 61.

*Plug connections for alphabetic, numeric, and punctuation printing*

For the particular card columns which are perforated to control listing of numeric, alphabetic and punctuation printing, selected by the card holes 8–3, 8–4 or the N pulse, plug connections 161 are made from the plug sockets 160 to the plug sockets 162 of the orders selected for such type of listing. The plug connections 180 are always made when numeric printing is to be effected. The plug connection 161 is made in each order that alphabetic or numeric listing is made, and for punctuation printing selected by card holes 8–4 or 8–3 or the N pulse, but is omitted in orders selected for special comma and decimal point printing, as will be explained.

It will be recalled, referring to the code of Fig. 7, that a 0, X, R hole is analyzed after a digit hole 1–9. For alphabetic type group and type selection the circuit is from plug socket 162, cam contacts 163 closed at 9–1, 0, X, R, print magnet 61, contacts 166, cam contacts 167 closed during 9–1, to line 23. After the first energization of print magnet 61 contacts 165—166 transfer in a manner previously described to close contacts 165 and open contacts 166. The second impulse under control of card holes 0, X, R is then from plug socket 162, cam contacts 163 also closed during 0, X, R, print magnet 61, contact 165 to line 23. This second energization of print magnet 61 will effect the selection of type of the selected group according to the 0, X, R holes used as pilot holes.

The N impulse transmitted by contacts 164 through plug connections 188 for numeric listing, special punctuation printing selected by holes 8–4 or 8–3 and N impulse, will be transmitted to the print control magnet 61 but for alphabetic listing and this special punctuation printing, this second impulse is ineffective due to the previous engagement of the printing clutch effected by a reception of an impulse at 0, X, R time. It is preferred that plug connections 180 should be made in every order so that the plug circuits be alike for numeric and alphabetic listing. However, to prevent improper operations when punctuation printing is called for independent of card holes, as in printing a comma and a decimal point, the plug connection 188 is omitted.

*Automatic decimal point and comma printing*

It is desirable when printing a report on an accounting machine that certain digits be separated by a comma and a decimal point so that the printed results appear in a conventional manner. For example, in printing the number 108010 it is desirable that this be printed on the result sheet as 1,080.10, said number representing dollars and cents in the decimal monetary system. If said number is to represent only units it should be printed as 108,010. The arrangements now to be described have provisions for printing the decimal point and commas at desired column positions of the result sheet since the comma and decimal point control are arranged to be selective, and for this reason the printing wheel of every order carries the decimal point type and punctuation type.

*Comma printing control*

Every printing wheel is provided with a group of printing characters comprising the . # , * so that any printing order may be selected for printing a comma. In the illustrative example the comma should appear in column 7 or to the left of the hundreds of dollars order. It is further desirable to suppress the printing of the comma unless the next higher order, or column 8, represents a significant digit 1–9.

Printing of the comma in any desired order is selected by a plug connection 187 made between a plug socket 162 of the selected column and a plug socket 188, thereby connecting the print control magnet 61 in the circuit with cam contacts 185. From Fig. 9 it will be evident that cam contacts 185 close at 337° of the cycle preceding that in which the comma should be printed. At this point in the cycle a circuit will be completed from line 24, through cam contacts 185, plug socket 186, plug connection 187, plug socket 162, cam contacts 163 which are now in normal position, through printing control magnet 61, contacts 166 and 167, to the line side 23, thereby sending the first impulse to the printing control magnet 61. At 337° the high point 170a of cam 170 (see Fig. 1a) is in contact with the follower 175 with the result that contacts 165, 166 are in the normal position shown so that the above described circuit to magnet 61 can be completed through contacts 166.

Referring to Fig. 9, at 337° cams 100A and 100B present High points to the associated latching members 110A and 110B. It will be noted from the Table II that these are the same latches which are latched when holes 8 and 3 are analyzed. These latches remain in latched position and at about 123° of the operating cycle cams 100C and 100D present their Medium cam portions to their respective unlatched members 110C and 110D, at which time the 8–3 notch of cam 125 is correlated with the cam follower extension 118 of arm 113 (see Fig. 1b). This will cause spring 114 to move the operating link 63 to the left to transmit a mechanical impulse to rock the clutch release arm 67 and the printing wheel for column 7 will be initiated in its rotation at approximately 135° of the operating cycle to rotate the printing wheel 40–44 teeth and successively present . # , * to the printing line.

The selection of the comma is effected by transmitting an impulse at 0 time, which impulse preferably comes from the same cam contacts 185. Assuming that a significant digit 1–9 will be printed in column 8 and that contacts 166 in such column are open and contacts 165 are closed, the circuit for transmitting the second impulse at the 0 time is from the line side 24, through cam contacts 185, plug socket 186, plug connection 187, plug socket 162, cam contacts 163, printing control magnet 61, contacts 166 of column 7 which are now closed, through cam contacts 168 of column 7 which are now closed, plug connection 180, cam contacts 169 now closed, contacts 165 associated with column 8 which are now closed, to the line side 23. Thus, upon the printing of a significant digit 1–9 in the next higher order a comma will be printed. Upon the absence of printing any of such significant digits contacts 165 will be open and thus the impulse circuit to transmit the second impulse to printing control magnet 61 will be open at this point. Accordingly, the print clutch shown in Fig. 1a will not be engaged and the print wheel 60 will not be impressed against the platen 90. In this case the print wheel will be merely rotated to select the desired group of type and then at the end of the cycle be returned to normal position without effecting any printing therefrom.

*Decimal point printing control*

It is desirable, as previously stated, to print a decimal point when the accounting machine is utilized to print monetary amounts. Referring to Figs. 1a and 7 the decimal point printing character is in the same group of type as the comma printing character and since the decimal point type is on each printing wheel, any order may be selected for printing it. Accordingly, a supplemental cam contact 184 (Figs. 8b and 9) is provided to transmit an impulse at 337° of a cycle preceding the cycle a decimal point is to be printed to select this group of type in the manner previously described. To render the decimal printing control effective a plug connection 189 (Fig. 8b) is made to the plug socket 162 pertaining to column 3, or the column in which the decimal point should be printed. The impulse circuit for transmitting the type group selecting impulse is from the line side 24, through cam contacts 184, plug connection 189, plug socket 162, contacts 163 now closed, printing control magnet 61, contacts 166 and 167 now closed, to the line side 23.

As is shown in the timing diagram of Fig. 9 the decimal point printing type is selected by the transmission of the R impulse which occurs at about 172° of the following machine cycle and which is preferably effected by cam contacts 184. The R impulse is transmitted to the print control magnet 61 of column 3 through selective electrical paths which are effective under and according to certain conditions. If the decimal amount to be printed is .03, for example, the circuit path will be completed from the line side 24 through cam contacts 184, plug connection 189, contacts 163, print magnet 61, contacts 166 of column 3, contacts 168 of column 3 which are closed at the R impulse time to a plug socket 190 and thence through a plug connection 191 to a plug socket 192, through contacts 169 of the units order which are closed at the R impulse time, then through contacts 165 of the units order which are now closed because a significant digit 3 is printed in the units order, thence to the line side 23. The same circuit is effective to energize print control magnet 61 of column 3, if any digit 1-9 is to be printed in the units order.

Assuming now that the 0 will be printed in the units order and, therefore, contacts 166 in the units order will be closed, and that a significant digit 1-9 is to be printed in the tens order, the circuit will further extend from said contacts 166 of the units order, through contacts 168 of the units order, plug connection 180, contacts 169 of the tens order, contacts 165 of the tens order which are now closed because a significant digit 1-9 is to be printed, thence to line side 23.

Summarizing, means is provided in the form of two electrical circuits which selectively or collectively cause decimal point printing when a significant digit is printed, either in the units order, the tens order or both.

At times the monetary amount to be printed would have zeros printed in the units and tens order and a significant digit would be printed in any order higher than the tens order. For example, in printing the monetary amount 1,080.00, the first significant digit to the left of the decimal point is 8, which is in the thousands order. The impulse circuit for the print control magnet 61 is, under such conditions, extended from the plug socket 190, through a unidirectional rectifying unit R, through cam contacts 169 of the hundreds order, through contacts 166 of the hundreds order which are now closed because 0 is printed in such order, through contacts 168 of the hundreds order now closed, plug connection 180, cam contacts 169 of the thousands order now closed, thence through contacts 165 of the thousands order which is now closed because a significant digit 8 is printed, to the line side 23. In the same way this circuit is completed through the contacts 165 of any printing order to the left of the decimal point printing column through associated contacts 165. If the amount should have been 1,000.00 the contacts 165 in column 8 would have been the contacts which close the circuit to the print magnet 61 so that the latter would select the R type selecting impulse.

Obviously, in the event that all orders would represent 0, none of the aforesaid impulse circuits would be closed because of the opening of contacts 165 in the units and tens order, and the second impulse circuit would not be closed because of the opening of contacts 165 in all orders higher than column 3. In this instance the printing wheel for column 3 will merely rotate to the decimal point printing position but it would not be impressed against the platen 90 and, therefore, decimal point printing would be prevented.

*Zero print control*

The zero print control circuits function, in a general sense, like those of the zero print control circuits of the patent to Ralph E. Page et al., No. 2,438,071, issued March 16, 1948. The result is that zeros to the left of the first significant digit, and to the left of the decimal point (if the significant digit is in the units and tens order) will not be printed. In the event that the digit is in the units column only, the decimal point will be printed, and the zero in the tens column will also print, as for the number .05. The latter zero print circuit will then include the tens order magnet 61, tens order contacts 168, plug connection 180, decimal point order contacts 169, 166 and 168, plug connection 191, contacts 169, and 165 of the units order, to line 23.

If the digit 1-9 should be in the tens order, such as .10, the zero print circuit for the units order includes the units print magnet 61, contacts 166 and 168 of the units order, contacts 169 of the tens order and plug connection 180, contacts 165 of the tens order which are now closed because of the significant digit 1-9 in the tens order, to line 23.

If the number is 6.00 the units order zero printing circuit includes the units printing magnet 61, units order cam contacts 169, plug connection 191, plug socket 190, rectifier unit R, cam contacts 169 and contacts 165 of the hundreds order to line side 23. The tens order print circuit includes additionally the tens order print magnet 61, cam contacts 169 of the tens order, plug connection 180, contacts 168 and 166 of the units order, to the units order cam contacts 169, the rest of the circuit being completed to line side as for the units order zero print circuit.

The zero print circuits to the left of the decimal point function precisely in the same manner explained in the aforesaid patent to Ralph E. Page et al., No. 2,438,071, and therefore need not be further explained. In general, the zero print circuit which includes any print magnet to the left of the decimal point, or any order to the left of the first significant digit cannot be closed, because no contacts 165 of any higher order are previously closed. This is always the case if no significant digit 1-9 is to be printed.

The purpose and function of the rectifier unit R will now be described. It is inserted to prevent the transmission of a zero print impulse to any print control magnet 61 of higher order above column 3, through the contacts 165 of the units or tens order, when these orders are to print a significant digit 1-9. If a 0 should be in the hundreds order the circuit to print magnet 61 cannot extend from contacts 169 of the hundreds order, the rectifier unit R, plug connection 191, cam contacts 169, contacts 165 to line side 23 because current cannot flow through the unidirectional rectifier R in this direction. There is the same effect for other higher orders. Thus 0 printing cannot be improperly effected in orders above the decimal point printing order, even though plug connection 191 is made.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record controlled printing machine, the combination of perforated record analyzing means, a plurality of digit type carrying members of successive denominational orders and including a hundreds of dollars order and a thousands of dollars order, each having digit type 1-9, a type carrying member carrying a comma printing type, digit type selecting means under control of said analyzing means for causing said digit type carrying members to be positioned to print digits 1-9, means separate from said analyzing means for positioning said comma type carrying member for selecting for printing the comma type, means for operatively associating the analyzing means with said digit type selecting means and in such manner as to provide an intermediate column between said hundreds of dollars and thousands of dollars order for printing the comma, and means responsive to the setting of the thousands of dollars type carrying member for causing the selection of the comma type for printing when said thousands of dollars type carrying member is to print digit type 1-9 and for preventing the selection of the comma type for printing when none of the digit type 1-9 is to be printed.

2. In a record controlled printing machine, the combination of perforated record analyzing means, a plurality of digit type carrying members of successive denominational orders including a hundreds of dollars order and a thousands of dollar order, each having digit type 1-9, a punctuation type carrying member carrying a group of type including a comma printing type, digit type selecting means under control of said analyzing means for causing said digit type carrying members to be positioned to print a plurality of digits 1-9, intermediate punctuation type group selecting means separate from said analyzing means for positioning said punctuation type carrying member to select said group of punctuation type for printing, comma type selecting means for selecting the comma printing type of said group, means for operatively associating the analyzing means with certain of said type selecting means in such manner as to provide a column space between the hundreds and thousands dollars orders for printing a comma, and means controlled by the digit type selecting means of the thousands of dollars order for causing said comma type selecting means to select the comma type for printing when the thousands of dollars digit type carrying member is to print digit type 1-9 and for suppressing the operation of the comma type selecting means when none of the digit type 1-9 is to be printed.

3. In a record controlled printing machine, the combination of perforated record analyzing means, a plurality of digit type carrying members for the units, tens, hundreds and higher denominational orders, each having digit type 1-9, a member carrying a group of type including a decimal point type, digit type selecting means under control of said analyzing means for causing said digit type carrying members to be positioned to print digits 1-9, intermediate type group selecting means operable independently of said analyzing means for positioning said decimal point type carrying member for printing from a selected type of the group of type, means for operatively associating the analyzing means with said digit type selecting means in such manner as to provide a column space between the tens and hundreds order for printing from the decimal point type, and means controlled by the digit type selecting means of any higher order at the left of said column space for causing the selection of the decimal point printing type from the group for printing when any type carrying member at the left of said column space is to print digit type 1-9.

4. In a record controlled printing machine, the combination of perforated record analyzing means, a plurality of digit type carrying members for the units, tens, hundreds and higher denominational orders, each having digit type 1-9, a member carrying a group of type including a decimal point type, digit type selecting means under control of said analyzing means for causing said digit type carrying members to be positioned to print digits 1-9, type selecting means operable independently of said analyzing means for positioning said decimal point type carrying member for selection of said group of type, means for operatively associating the analyzing means with said digit type selecting means in such manner as to provide a column space between the tens and hundreds order for printing from the decimal point type, means controlled by the digit type selecting means of any higher order at the left of said column space and operable in the absence of printing digits 1-9 in the units and tens order for causing the selection of the decimal point type for printing when any digit type carrying member at the left of said column space, is to print digit type 1-9, and supplemental means operable in the absence of printing any digits 1-9 at the left of the column space and controlled by the digit type selecting means of either the units and tens order when digits 1-9 are to be printed for causing the selection of the demical point type for printing.

HORACE S. BEATTIE.
RALPH E. PAGE.
EDWARD J. RABENDA.

REFERENCES CITED

The following references are of record in the file of this patent:

UNITED STATES PATENTS

| Number | Name | Date |
|---|---|---|
| 2,199,561 | Fuller | May 7, 1940 |
| 2,438,071 | Page | Mar. 16, 1948 |
| 2,518,063 | Rabenda | Aug. 8, 1950 |